UNITED STATES PATENT OFFICE.

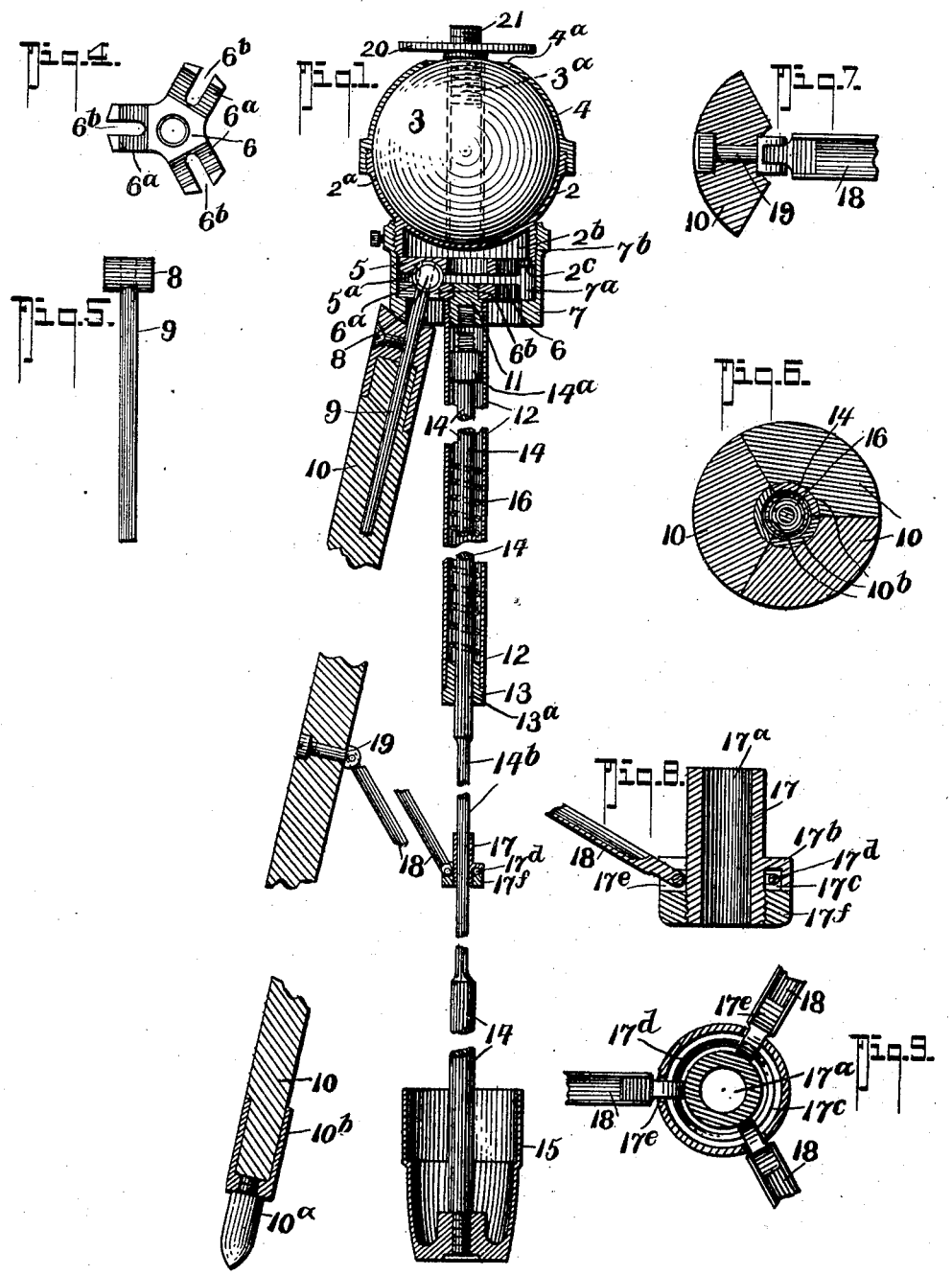

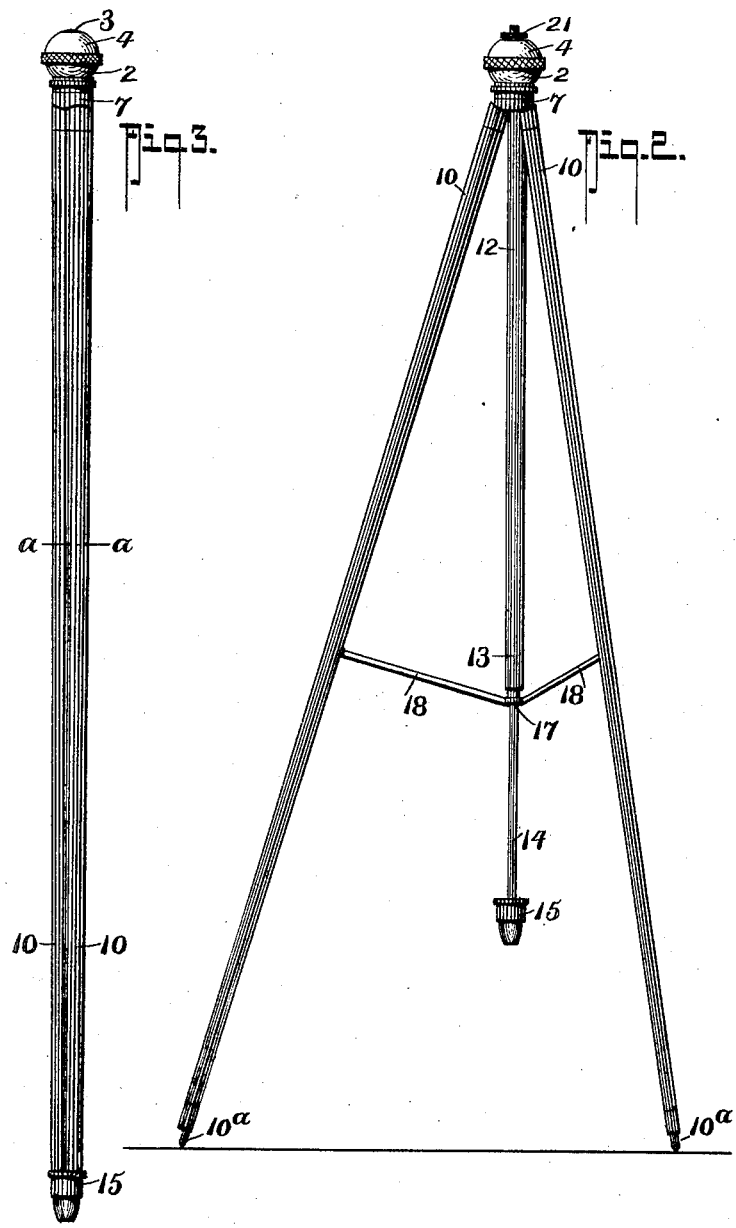

CHARLES WHETHAM, OF RUSKIN, CANADA.

TRIPOD CAMERA-SUPPORT.

SPECIFICATION forming part of Letters Patent No. 686,872, dated November 19, 1901.

Application filed April 1, 1901. Serial No. 53,982. (No model.)

*To all whom it may concern:*

Be it known that I, CHARLES WHETHAM, a citizen of the Dominion of Canada, residing at Ruskin, in the Province of British Columbia, Canada, have invented a new and useful Tripod Camera-Support, of which the following is a specification.

My invention relates to improvements in camera-tripods; and its object is to so improve that class of tripods designed in the form of a walking-cane but susceptible of being converted into a camera-tripod in a rapid, simple, and convenient manner.

A further object is to provide means of leveling or adjusting the camera after being set up without moving the legs thereof, which on uneven ground is very essential to attain a rapid and satisfactory result.

My invention also embodies novel parts of construction, which form important advantages over other known devices in the art, which will be carefully pointed out in the specification and also set forth in the appended claims.

My objects are attained by the mechanism illustrated in the accompanying drawings, in which—

Figure 1 is a vertical section in detail through one leg of tripod. Fig. 2 is an elevation of tripod with legs extended as in use. Fig. 3 is an elevation with legs closed, in which form it provides a walking-cane. Fig. 4 is a detail plan of the wing-plate 6. Fig. 5 is a detail of the tripod-leg hinge. Fig. 6 is a cross-section of the tripod when closed on line *a a* in Fig. 3. Fig. 7 is a detail section showing attachment of spreading-strut to tripod-leg; and Figs. 8 and 9 are section and plan, respectively, of running-sleeve attachment of struts to central rod.

Similar numerals refer to similar parts throughout the several views.

The numeral 2 indicates a headpiece having a half-spherical ball-socket $2^a$ in its upper end, in which is arranged to lie a sphere 3, having a threaded aperture $3^a$ through its center for a purpose to be made clear hereinafter, and this sphere 3 is held rotatably in its position by a ring 4, threaded to the upper rim of the head 2, which ring forms the upper half of the spherical recess to retain said sphere. By reason of this ring 4 being threaded to the rim of head 2 it may be clamped upon the sphere to prevent it turning too easily, and the opening $4^a$ in the ring 4 provides access to the threaded aperture $3^a$ in the sphere for the purpose of connecting a camera thereto.

In the lower end of the head 2 is a recess $2^b$, the rim of which is provided with an annular recessed rim or seat $2^c$, in which is fitted a three-winged plate 5. The lower sides of the wings of this plate 5 are provided with channeled grooves $5^a$, the axes of which are placed at right angles to the radial lines on the said plate, and arranged beneath this plate 5 is a similar one 6, having on the upper sides of its wings concaved or channeled grooves $6^a$, to form with the channels $5^a$ in the plates 5 cylindrical openings between such plates for a reason to be seen presently, and said plates are held in place and forced toward each other by a nut 7, having an annular recess $7^a$ to receive the lower outer edges of the wings of the plate 6, which threads onto the outer rim of the head 2, as at $7^b$.

Lying in the cylindrical openings $5^a$ and $6^a$ between the plates 5 and 6 are trunnions 8, to the centers of which are rigidly fixed depending stems 9, which are allowed to swing outward by reason of radial slots $6^b$, cut in the plates 6 as far back as the channeled grooves $6^a$. The depending ends of these stems 9 are suitably fixed into tripod-legs 10, the lower ends of which are provided with retaining-spikes $10^a$, and the inner sides or angles are channeled, as at $10^b$, (see Fig. 6,) so that when closed up there is a cylindrical opening up the center of such closed legs, the full object of which will be seen presently.

Screwed into the center from the under side of the plate 6 is a nipple or plug 11, the depending portion of which is enlarged and also threaded, and threaded onto this depending portion of said nipple 11 is a tube 12, the lower end of which is provided with a plug 13, having an aperture $13^a$ through its center.

Passing upward through the aperture $13^a$ and with its upper end susceptible of being threaded into a tapped aperture in the center of the nipple 11 is a rod 14. This rod 14 is provided at the base of the threaded portion at its upper end with a fixed collar 14ª, with a reduced portion 14ᵇ a little below its center, and has attached to its lower end a ferrule 15, which ferrule is designed to receive the tips of the legs when brought together.

Lying within the tube 12 and over the rod 14 is a coil-spring 16, which is compressible between the collar 14ª and the upper end of the plug 13 in the lower end of said tube when such rod is detached from the nipple 11 and pulled down.

Slidably mounted on the reduced portion 14ᵇ of the rod 14 is a sleeve 17, to which are pivoted spreading-struts 18, the opposite ends of which are pivoted to studs 19, fixed in the fluted sides of the legs 10. These spreading-struts 18 are made of channeled material, as shown, so that they will lie back in the channels of the legs 10 out of the way, and by reason of the inner rod 14 being much smaller than the tube 12 there is ample room within the hollow of the stick or cane at this point for the struts 18 when the legs are folded together.

As better shown in Figs. 8 and 9, the sleeve 17 is composed of a member having an aperture 17ª therethrough for the reception of the rod 14, and a flange 17ᵇ about its center in which is arranged an annular groove 17ᶜ for the reception of the retaining wire or ring 17ᵈ, which passes through apertures in the ends of the struts 18. Radial slots 17ᵉ are cut in the sides of the flange to receive and allow the struts up-and-down movement, and a ring 17ᶠ, threaded to the end of the sleeve and arranged to lie over the groove 17ᶜ, prevents the pivoted ends of the struts from being displaced.

The above provides a simple and substantial fastening for the ends of the struts and one that may be easily repaired if the wire 17ᵈ should become fractured.

When closing up the device and converting it into a cane, as shown in Fig. 3, the rod 14 is detached from the nipple 11 and pulled down far enough to receive the lower ends of the legs within the ferrule 15. This will close up the legs and will compress the spring 16, so that when the tips 10ª enter the ferrule the same will be drawn up by the tension of said spring and will hold the legs tightly together as an integral shaft.

In transforming the device into a tripod the ferrule 15 is simply pulled down, the legs 10 opened, and the rod 14 pushed up and screwed into the nipple 11. This will bring the shoulder 14ᶜ on the rod against the sleeve 17 and force it upward against the plug 13, when the legs are fully expanded, and when the rod is drawn down for closing the reduced portion 14ᵇ will slip through the sleeve until the shoulder 14ᵈ is engaged, which will force the said sleeve down and close the legs, so that a pressure on the exterior will complete the operation.

The camera is fixed to the disk-screws 21, the one end of which is screwed into either end of the aperture 3ª in the sphere, and by reason of this being movable the camera may be readily adjusted to the desired position.

By turning the nut 7 the trunnions 8 will be so clamped that the legs will be made to move as stiffly as desired, and in like manner by turning the ring-nut 4 the ball 3 will be clamped, so that the camera will be held in any position it may be placed. This latter is very important, as in the event of the ground being uneven where the instrument is being set up the legs when planted would not hold the rod 14 perpendicular; but by the adjustability of the sphere the camera attached thereto may be leveled without delay or difficulty.

From the foregoing it is shown that there are no detachable parts in its transformation from a cane to a tripod camera-support, excepting the disk-screw 21, which when not in use is attached to the camera. It is also manifest that the range of usefulness of my invention may be extended further than that already brought out. For instance, by attaching a suitable board or rest to the disk-screw 21 the tripod may be employed as a holder for books or like articles in a study, especially where it is desirous to refer to any large volume.

Having thus described my invention, what I claim as new, and desire to be protected in by Letters Patent of the United States, is—

1. A camera-tripod, comprising the following elements in combination; a headpiece, having a spherical socket, a spherical member adjustably held within said socket, and having a camera-receiving portion, extended outside of the head, the said head having a pendent recess, winged plates, having trunnion-seats held within the said recess, means in the recessed end of the head for moving the winged plates toward each other, bars having trunnions for engaging the aforesaid trunnion-seats, and foldable legs connected to said bars, all being arranged substantially as shown and described.

2. In combination with a tripod having an adjustable sphere to support the instrument or other article to be held suitably mounted in a head; a recess in the lower end of such head having a nut threaded thereto; annular seats within the recess in the head and the nut; plates having trunnions clampably arranged therebetween within such seats in the recess; stems 9 fixed to the trunnions and slots in the wings of the lower plates through which the stems are enabled to swing outwardly; legs 10 having channeled centers secured to said stems; a depending nipple 11 secured in the center of the lower plate; a tube threaded to said nipple having its lower end stopped with a plug with an aperture therethrough; a rod 14 having a collar near its upper end and a reduced portion below its center arranged within said tube and projecting below the same and means for attaching said rod to the nipple 11; a coil-spring on the rod 14 within the tube 12; a running ferrule 17 mounted on the reduced portion of the rod 14; struts 18 connecting the ferrule and the legs, and a ferrule 15 fixed to the depending end of said rod.

3. In a camera-tripod as described, a head, having a pendent recess, two plates held therein, having opposing trunnion-seats, said recess having a central bottom opening, in combination with a tube attached to the lower one of the winged plates, a rod 14 connected to said tube, a spiral spring, coöperating therewith, a collar on the rod above the spring, an apertured plug in the lower end of the tube, upon which the said spring rests, said rod 14 having a reduced portion, a running ferrule 17, mounted on said reduced portion, the tripod-legs, the struts 18, pivotally secured to the ferrule 17 and to the tripod-legs, and a ferrule 15, in the lower end of the rod 14 to receive the tips of the legs when folded together, substantially as shown and described.

4. In a tripod having legs with fluted inner sides hinged to a suitable head; a tube secured to a depending nipple adjacent to the hinges of, and between the legs; a rod and a spiral spring thereon arranged within the tube, said rod being extended below the tube and having near its upper end a fixed collar above the spiral spring, and an apertured plug 13 in the lower end of the tube to support the said spring; a reduced portion $14^b$ on the rod projecting below the plug; a ferrule 17 slidably mounted on such reduced portion of the rod; spreading-struts pivoted to said ferrule and to the fluted sides of the legs; a ferrule 15 fixed to the lower end of the rod; means for attaching the rod to or detaching it from the center of the nipple, whereby the legs may be opened and the ferrule 17 clamped against the plug 13, and whereby the legs may be closed and their tips received in the ferrule 15, said ferrule 15, being then securely held in position by the action of the spiral spring, as set forth.

5. In a tripod having legs with fluted inner sides and hinged to a suitable head; a tube attached to a depending nipple between the legs and a rod axially movable within said tubes; a collar near the upper end of the rod and an apertured plug in the lower end of the tube, through which the rod slides; a coil-spring on such rod within the tube between the said collar and the plug in the tube, in combination with a reduced portion on the rod having mounted thereon a running ferrule; spreading-struts communicating between the ferrule and the flutes of the legs; a ferrule 15 fixed to the bottom of the rod, and means for pushing the rod up and locking it with the running ferrule clamped against the plug in the lower end of the tube, substantially for the purposes set forth.

6. In combination with a tripod having legs with fluted inner sides hinged to a suitable head; a rod, having a reduced portion, axially movable within the hollow formed by the flutes in the legs; a ferrule 17 slidable on such reduced portion, consisting of a member with a flange $17^b$ in which is arranged an annular groove; a wire $17^d$ in such groove, and a cap-ring $17^f$ designed to screw on the end of the ferrule and cover the groove, and radial slots $17^e$ for the reception of arms or struts; fluted struts with their inner ends pivoted to the wire $17^d$ and their outer ends pivoted to studs 19 secured in the fluted sides of the legs, substantially for the purposes specified.

In testimony whereof I have hereunto signed my name to this specification in the presence of two subscribing witnesses.

CHARLES WHETHAM.

Witnesses:
ROWLAND BRITTAIN,
W. G. TRETHEWEY.